Dec. 6, 1949        E. A. SAHLIN        2,490,653

SAFETY MECHANISM FOR ELEVATORS

Filed Sept. 2, 1948        4 Sheets-Sheet 1

Eric Albert Sahlin INVENTOR

BY Mathu&Bradley ATTORNEY

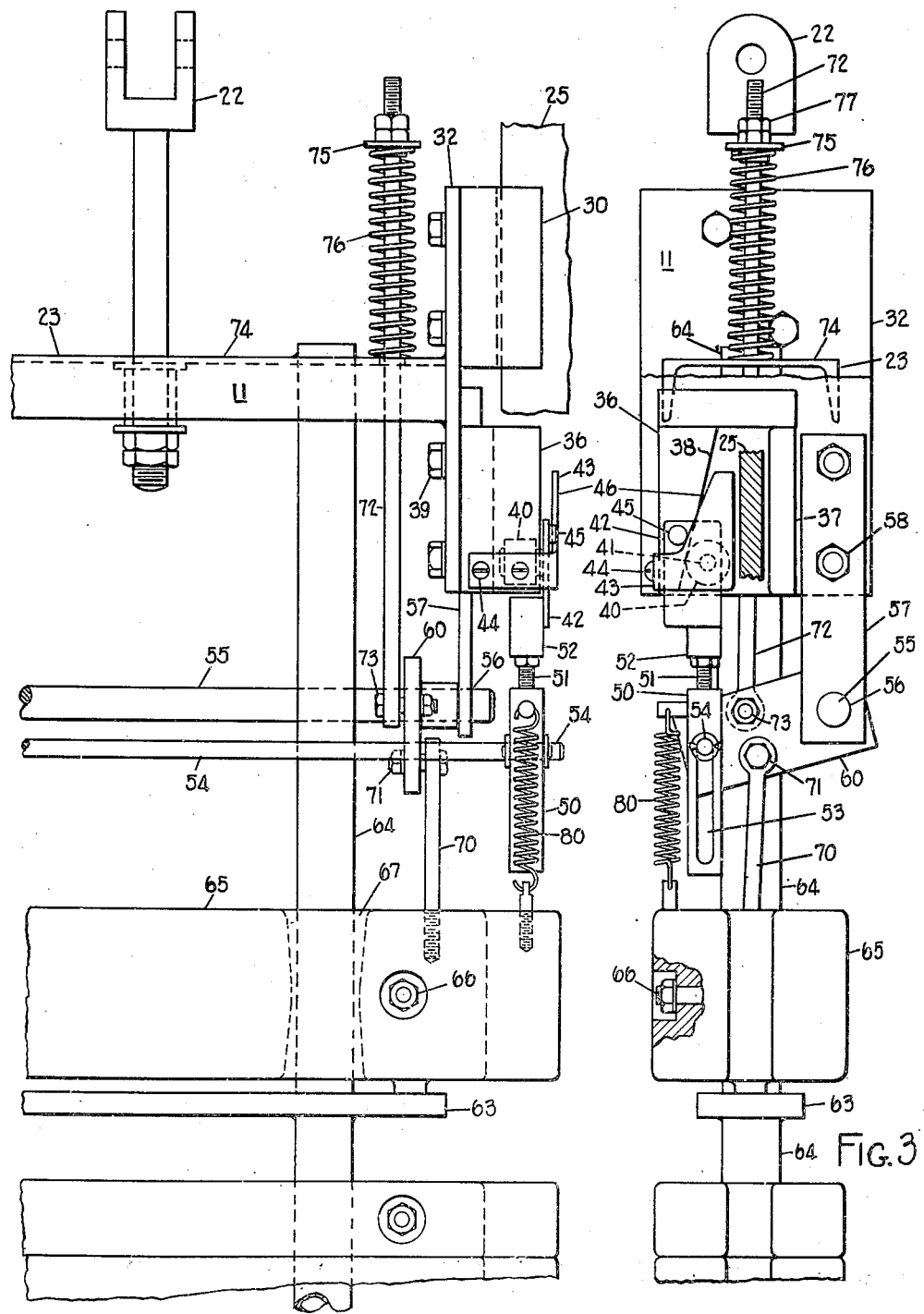

Dec. 6, 1949  E. A. SAHLIN  2,490,653
SAFETY MECHANISM FOR ELEVATORS
Filed Sept. 2, 1948  4 Sheets-Sheet 4

Eric Albert Sahlin  INVENTOR
BY Matthew E. Bradley  ATTORNEY

Patented Dec. 6, 1949

2,490,653

UNITED STATES PATENT OFFICE 2,490,653

SAFETY MECHANISM FOR ELEVATORS

Eric Albert Sahlin, Harrington Park, N. J., assignor to Otis Elevator Company, New York, N. Y., a corporation of New Jersey Application September 2, 1948, Serial No. 47,400

10 Claims. (Cl. 187—80)

The invention relates to safety mechanism for elevators.

In elevator installations, safety brakes are carried by the elevator car for engaging the car guide rails to bring the descending car to a stop under certain emergency conditions. Also safety brakes are provided in certain instances on the counterweight for the elevator car. There are several types of operating mechanism for safety brakes, one of these being the type that is brought into action by a governor in case of overspeed. Another type is that which actuates the safety brake in case the downward acceleration exceeds a certain amount. There are certain advantages in the acceleration type of safety actuating mechanism and it is especially suitable to protect the system under conditions of parted hoisting roping. The present invention is particularly directed to the acceleration type safety actuating mechanism.

One object of the invention is to provide safety actuating mechanism of the acceleration type which is of simple construction, quick to operate and reliable in operation.

Another object of the invention is to provide safety actuating mechanism of the acceleration type which may be readily combined with overspeed governor actuating mechanism.

In carrying out the invention according to the arrangement which will be described, a weight is carried by the movable body. This weight is partially balanced by a spring. The weight and spring are connected to an actuating member for the safety brake carried by the movable body. The spring is adjusted so that no relative movement of the weight with respect to the movable body takes place so long as the movable body in its downward movement does not exceed a certain acceleration. When this acceleration is exceeded, the acceleration of the weight becomes less than that of the movable body, resulting in upward movement of the weight relative to the body. This causes the safety brake to be applied to the guide rails. The spring is adjusted to cause actuation of the safety brake at a downward acceleration of the movable body less than gravity, preferably one half gravity or less depending upon the type of installation. Thus, in case of parting of the hoisting roping, the safety brake is applied almost instantaneously to bring the movable body to a stop.

Various features and advantages of the invention will become apparent from the above statements and from the following description and appended claims.

The invention will be described as applied to dumbwaiters for which it is especially suitable.

In the drawings:

Figure 3 is a side view with parts broken away of the counterweight of Figure 2, illustrating the counterweight safety brake and its actuating mechanism;

Figure 4 is a portion of a front view of the same; and

Figure 1:
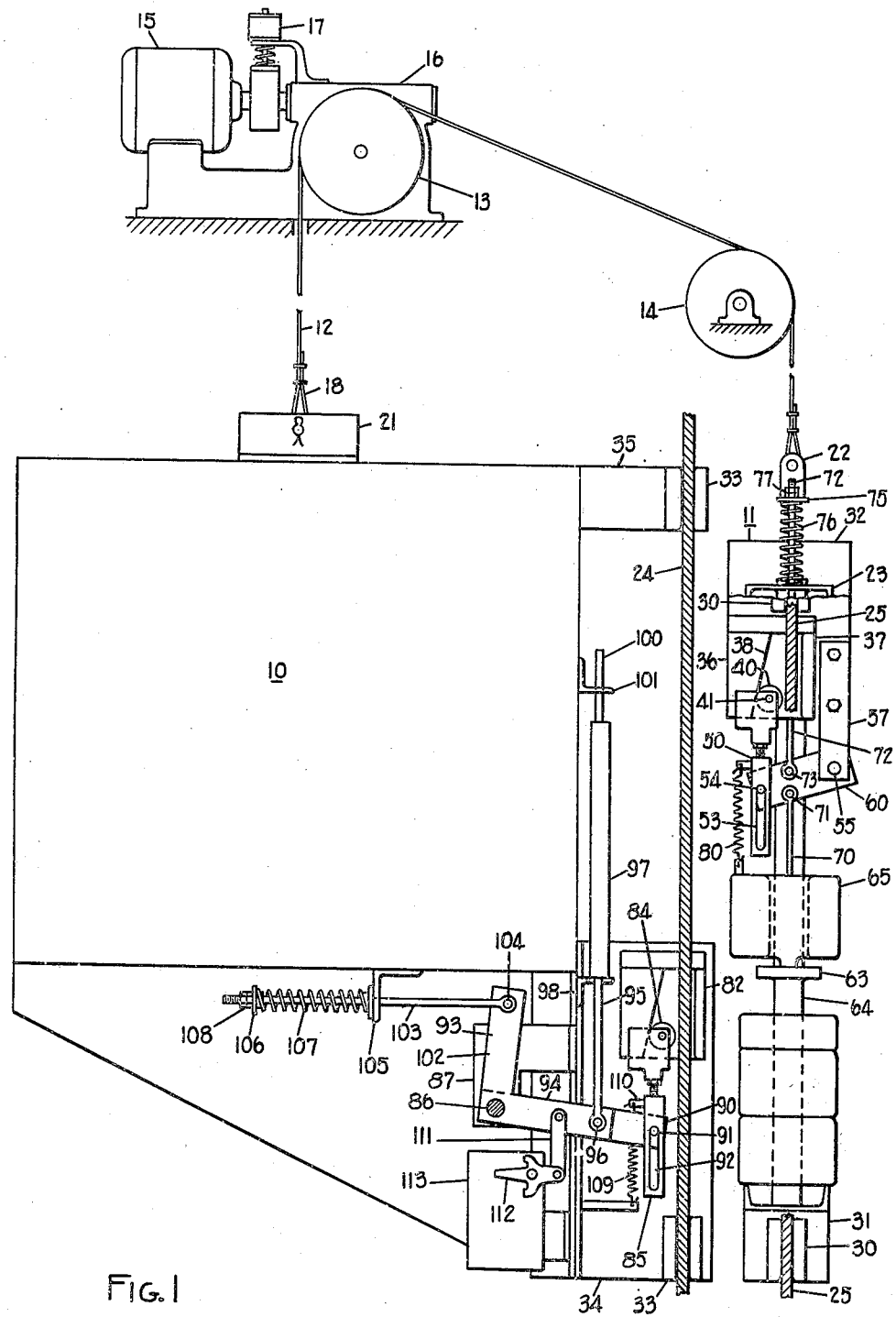
Figure 1 is a somewhat schematic view of a dumbwaiter installation embodying the invention.
Figure 2:
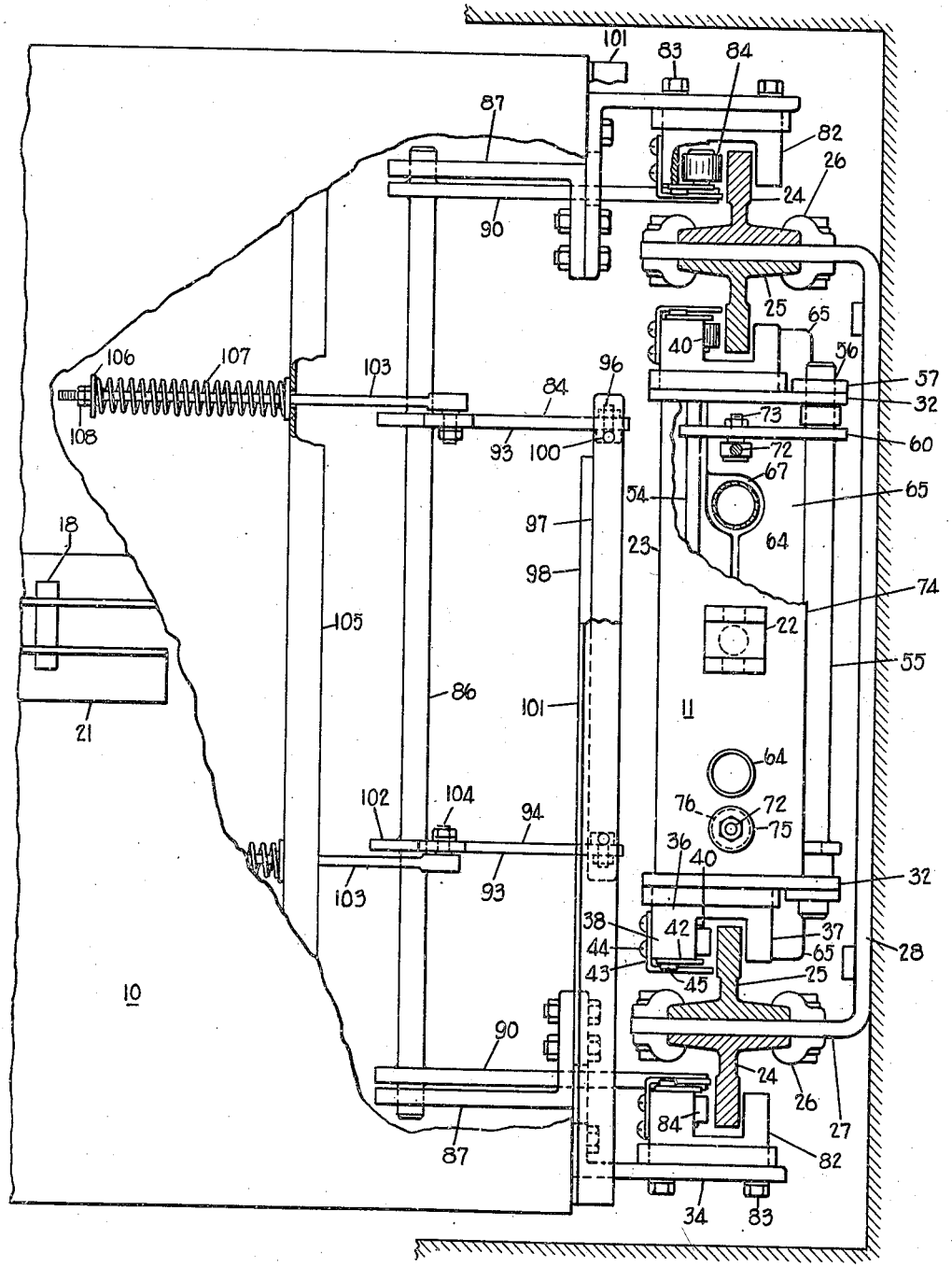
Figure 2 is an enlarged plan view with parts broken away of a portion of the dumbwaiter car and the counterweight of Figure 1, showing the construction of the safety brakes and their actuating mechanisms.

Referring to Figures 1, 2, 3 and 4, the dumbwaiter car 10 and counterweight 11 are suspended by a hoisting rope 12 which passes over a driving sheave 13 and a deflector sheave 14. The driving sheave is driven by a hoisting motor 15 through reduction gearing arranged in casing 16. 17 is the electromechanical brake for the motor. At the car end, the hoisting rope is secured by a hitch 18 to angle members 21 on the top of the car. At the other end, the hoisting rope is secured by a hitch 22 to the counterweight framework 23.

A pair of guide rails 24 is provided for the dumbwaiter car. These rails are positioned in back of the car. A pair of guide rails 25 is provided for the counterweight. The guide rails are of the conventional T form and are secured as by clamps 26 on opposite sides of the arms 27 of U-shaped brackets 28 mounted at intervals along the hoistway wall. These U-shaped brackets span the counterweight, the counterweight rails facing toward the counterweight and the car rails facing opposite the counterweight rails. Guide shoes 30 are carried by the counterweight, one on each side at the top and bottom, for cooperating with guide rails 25 to guide the counterweight. The lower two counterweight guide shoes are mounted on plates 31 secured to the bottom of the counterweight framework while the upper two counterweight guide shoes are mounted on plates 32 secured to the top of the counterweight framework. Guide shoes 33 are carried by the car, one at each side at the top and bottom, for cooperating with guide rails 24 to guide the car. The lower two of guide shoes 33 are mounted on brackets 34 secured to the bottom of the car while the upper two of guide shoes 33 are mounted on brackets 35 secured to the top of the car.

A safety brake is provided on the top of the counterweight for engaging the rails 25, this brake comprising a pair of rail clamps, one for each rail. Each rail clamp comprises a safety block 36 secured to the plate 32 as by bolts 39. This block has a straight sided portion 37 adjacent one side of the guide rail and a bevelled portion 38 adjacent the other side of the guide rail.

Roller 40 is provided between the bevelled portion 38 and the guide rail to be moved upwardly to apply the rail clamp to the rail. This roller is rotatively mounted on a pin 41 secured to a plate 42. A guard 43 for the plate and roller is secured to the safety block as by screws 44. A button 45 on plate 42 cooperates with the bevelled edge 46 of guard 43 to maintain the roller disengaged from the guide rail when the safety is not applied and to guide it into rail clamping position.

Upward movement of the roller into rail clamping position is effected by a lift block 50. This block has a threaded stud 51 extending upwardly therefrom on the upper end of which is adjustably mounted a connecting block 52. The roller plate 42 is secured to the connecting block as by welding. A vertical slot 53 is formed in each lift block for receiving the end of a rod 54 extending crosswise of the counterweight. A rock shaft 55 also extends crosswise of the counterweight, being pivotally mounted at its ends in apertures 56 formed in plates 57 secured as by bolts 58 to the plates 32. Operating levers 60 are secured on shaft 55 near its ends. These levers support cross rod 54 which extends through apertures formed in the levers.

Extending crosswise of the counterweight and supported on a plate 63 secured to vertical pipes 64 forming a part of the counterweight framework is a weight 65. This weight is formed in two portions and clamped together at each end as by the bolt 66. Apertures 67 are provided in the weight to allow relative movement thereof with respect to the pipes 64. At each end the weight is provided with an upwardly extending connecting rod 70 which is pivotally mounted on a pin 71 secured to lever 60. Another rod 72 is pivotally secured to lever 60 as by a pivot pin 73. Rod 72 extends upwardly from the lever through an aperture in the channel shaped cross member 74 forming a part of the counterweight framework. On rod 72 between member 74 and seat 75 is a compression spring 76. Nuts 77 are provided on the threaded end of this rod for adjusting the compression of the spring. These springs act to partially balance the weight 65. A tension spring 80 extending between a pin secured to lift block 50 and a pin secured to weight 65 biases the lift block for downward movement and thus the roller 40 in position disengaged from the guide rail. In this condition, the rod 54 engages the lift blocks 50 at the top of their slots 53.

A similar safety brake is provided on the bottom of the car for engaging the rails 24, this brake comprising a pair of rail clamps, one for each rail. Each clamp comprises a safety block 82 secured as by screws 83 to the bracket 34 at the bottom of the car. This rail block is of the same construction as the counterweight rail block and the roller 84 and its connection to the slotted lift block 85 is the same as for the counterweight rail clamp. A rock shaft 86 extends crosswise of the car, being pivotally mounted at its ends in brackets 87 secured as by bolts to brackets 34. Operating levers 90 are secured on shaft 86 near its ends. These levers support pins 91 which extend into the slots 92 of lift blocks 85. Bell cranks 93 are also secured to shaft 86. The sidewise extending arm 94 of each bell crank has a rod 95 pivotally secured thereto as by a pin 96. These rods extend upwardly and are secured to a weight 97 supported on bracket 98 secured to the car. The upper end of this weight has a pair of guide rods 100 which extend through apertures in an angle member 101 secured to the side of the car. The upwardly extending arm 102 of each bell crank has a rod 103 pivotally secured thereto as by a pin 104. This rod extends horizontally through an aperture in an angle member 105 secured to the bottom of the car. Between this angle member and a seat 106 is a compression spring 107. Nuts 108 are provided on the threaded end of this rod for adjusting the compression of the spring. These springs act to partially balance the weight 97. At each rail clamp a tension spring 109, extending between a pin 110 secured to lift block 85 and a pin secured to bracket 34, biases the lift block for downward movement and thus the roller 84 in position disengaged from the guide rail. In this condition, the pins 91 engage the lift blocks 85 at the top of their slots 92. Connected to the arm 94 of one of the bell cranks 93 is a link 111 which is connected to the operating lever 112 of a safety switch 113.

In operation, the weight carried by the movable body, say the weight 97 carried by the car, moves with the car as a unit so long as the acceleration of the car does not exceed a certain amount, depending on the compression of springs 107. Should this downward acceleration be exceeded the weight, due to the action of springs 107, does not accelerate as fast as the car with the result that there is upward movement of the weight with respect to the car. This causes operating levers 90 to be swung counterclockwise as viewed in Figure 1, the levers acting through pins 91 to move the lift blocks 85 and thus the rollers 84 upwardly with respect to the car, causing the rollers to wedge between the guide rails and the bevelled portions of the safety brake, thereby clamping the guide clamps to the rails to bring the car to a stop. As the car is moving at a faster speed than the weight at the instant the rail clamps are applied, the rollers are positively forced between the safety blocks and the rails due to force required to accelerate the weight to car speed. The slot 92 allows for the downward movement of the weight during the stopping action without releasing the safety brake. A similar action takes place in the event that the downward acceleration of the counterweight exceeds a certain amount.

It has been found desirable to adjust the springs 107 and 76 to cause operation of the safety brakes upon downward movement of the car or counterweight at a rate from about one quarter to one half gravity, depending on the particular installation. This is done for each body by adjusting the springs so that they exert a force opposite to the weight, say where it is desired to operate the safety at one quarter gravity, equal to three quarters of the weight.

When the hoisting rope 12 parts the downwardly moving body, say the car, starts to fall while the counterweight quickly stops its upward movement and starts to fall. The fall in each case is a substantially free fall so that the acceleration for which the springs are set is exceeded almost instantly. Also the weight in each case moves upwardly with respect to the falling body almost instantly to apply the safety brake to the guide rails.

The safety actuating mechanism has the advantage not only of applying the safety brakes very quickly in the case of broken hoisting roping but also works to apply the safety when the hoisting roping is intact and the acceleration for some other reason exceeds that for which the springs are set. The actuating mechanism has the further advantage that it is not dependent for its operation on any other roping in the hoistway which itself might be parted and thus not cause the safety brake to be applied.

Figure 5:
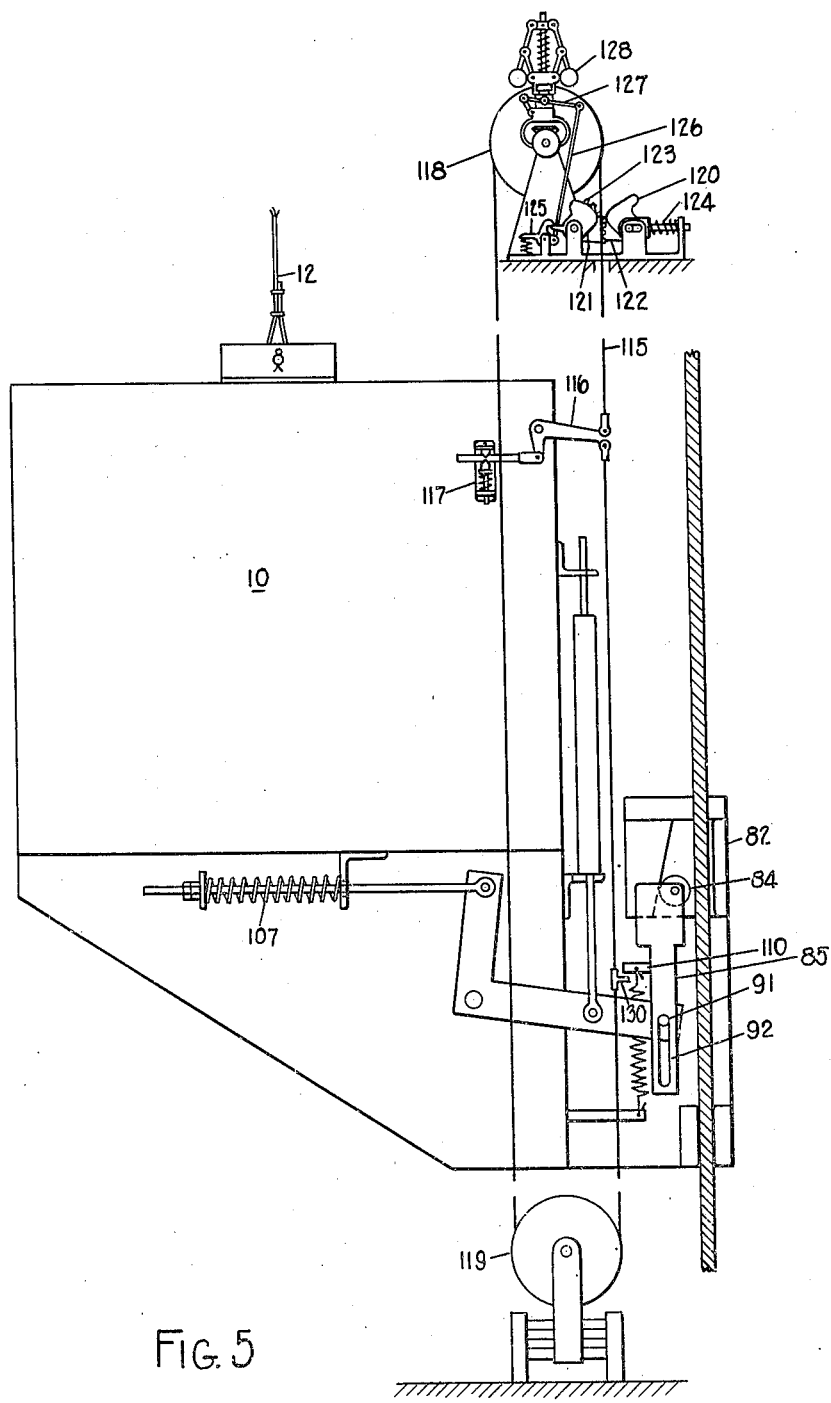
Figure 5 is a schematic view of the safety brake actuating mechanism for the dumbwaiter car of Figure 1 combined with overspeed governor actuating mechanism.

The mechanism for actuating the safety brake by acceleration may be readily combined with overspeed actuating mechanism and a suitable arrangement is illustrated schematically in Figure 5 in connection with the safety brake carried by the car. The mechanism for applying the safety brake upon exceeding acceleration for which springs 107 are set is the same as that previously described. The overspeed actuating mechanism comprises a governor rope 115 connected to the car by means of a bell crank 116 held by a releasing carrier 117. From the bell crank, the rope extends upwardly in the hoistway over a governor sheave 118, then downwardly around a tensioning sheave 119 and back to the bell crank. Two eccentric clutches 120 and 121 are provided for gripping the governor rope and are connected to move together by spur gear segments 122 and 123. Clutch 120 is biased toward clutch 121 by a spring 124. A spring latch 125 engages a projecting portion on clutch 121 to prevent the clutches engaging the governor rope unless a certain speed is exceeded. This latch is connected by a link 126 to a lever 127 pivotally mounted on the governor frame and adapted to be actuated by the fly ball mechanism 128. A lift member 130 is provided on the governor rope in position just below the pin 110 on lift block 85. Thus upon overspeed of the car in the down direction the governor acts to release the latch 125, allowing the clutches 120 and 121 to grip the governor rope. This causes counterclockwise movement of lever 116. This causes lift member 130 to be pulled upwardly relative to the car to engage pin 110 and thus pull lift block 85 into position to apply the rail clamp to the guide rail. It is to be noted that the overspeed actuating mechanism and the acceleration actuating mechanism act independently of each other in applying the safety brake, the slot 92 in the lift block moving upwardly with respect to pin 91 when the overspeed actuating mechanism functions and the pin 110 moving upwardly with respect to the lift member 130 when the acceleration actuating mechanism functions. This particular arrangement has the advantage that it provides overspeed protection and at the same time insures the application of the safety brake should the hoisting roping and governor roping both part.

While the combination overspeed and acceleration actuating mechanism of Figure 5 has been described as applied to the car, it may be applied to the counterweight. Also, while the acceleration actuating mechanism has been described as applied to both car and counterweight in Figures 1, 2, 3 and 4, it may be applied to only one of them in certain instances, usually the car. Furthermore, while a roll type safety has been illustrated, the invention is applicable to other types of safety brakes, for example the flexible guide clamp safety.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator system in which safety mechanism is provided on a body movable in the hoistway for application to a guide rail to stop said body, actuating mechanism for said safety mechanism comprising; a weight carried by said body adapted for relative movement with respect thereto; resilient means carried by said body partially balancing said weight; and means operable upon said relative movement of said weight with respect to said body to apply said safety mechanism to said rail.

2. In an elevator system in which safety mechanism is provided on a body movable in the hoistway for engaging a guide rail to stop said body, actuating mechanism for said safety mechanism comprising; a weight carried by said body adapted to move upwardly with respect thereto; resilient means carried by said body and connected to said weight to act in opposition thereto; and means actuated by relative upward movement of said weight with respect to said body to apply said safety mechanism to said rail to bring the body to a stop.

3. In an elevator system in which safety mechanism is provided on a body movable in the hoistway for engaging a guide rail to stop said body, actuating mechanism for said safety mechanism comprising; a weight carried by said body adapted to move upwardly with respect thereto; a spring carried by said body and connected to partially balance said weight and adjusted so that upward movement of the weight relative to said body takes place when the downward acceleration of the body exceeds a certain amount; and means actuated by said relative upward movement of said weight with respect to the body to apply said safety mechanism to said rail to bring the body to a stop.

4. In an elevator system in which a safety brake rail clamp is provided on the car for engaging a guide rail to stop the car, actuating mechanism for said rail clamp comprising; an operating member adapted for movement to apply said clamp to said rail; a weight carried by the car adapted to move upwardly with respect thereto; a compression spring carried by the car and connected to said weight to act in opposition thereto and adjusted so that upward movement of the weight relative to the car takes place when the downward acceleration of the car exceeds a certain amount; and a lever actuated by said relative upward movement of said weight with respect to the car to move said operating member to apply said rail clamp to said rail to bring the car to a stop.

5. In an elevator system in which a safety brake rail clamp is provided on the car for engaging a guide rail to stop the car, said rail clamp having a roller normally disengaged from the rail adapted to be moved to between the rail and the bevelled side of a safety block to apply the clamp to the rail, actuating mechanism for said rail clamp comprising; an operating member adapted to move said roller into clamp applying position; a spring for biasing said operating member for downward movement; an actuating lever for said operating member pivotally mounted on said car; a weight carried by the car adapted to move upwardly with respect thereto and connected to said actuating lever; a compression spring carried by the car connected to said actuating lever to act in opposition to said weight and adjusted so that upward movement of the weight relative to the car takes place when the downward acceleration of the car exceeds a certain amount; and means connecting said actuating lever to said operating member to cause upon said relative upward movement of said weight with respect to the car operation of said operating member to move said roller into clamping position thereby applying said rail clamp to said rail to bring the car to a stop.

6. In an elevator system in which a safety brake is provided on the car for engaging the car guide rails to stop the car, said brake comprising a pair of rail clamps, one for each of said rails, each clamp comprising a safety block extending on each side of the rail, one side of the block facing the rail being bevelled, and a roller between said bevelled side and said rail normally disengaged from said rail, actuating mechanism for said brake comprising; a lift block for each rail clamp adapted upon upward movement to move said roller of such clamp into position between the rail and the bevelled side of the safety block of such clamp, said lift block having a vertically extending slot; a spring for each lift block for biasing it for downward movement; a rock shaft carried by the car; an actuating lever for each lift block mounted on said rock shaft; a pair of bell crank levers mounted on said rock shaft; a weight carried by the car adapted to move upwardly with respect thereto and connected to said ball crank levers; a pair of compression springs carried by the car respectively connected to the bell crank levers to act in opposition to said weight and adjusted so that upward movement of the weight relative to the car takes place when the downward acceleration of the car exceeds a certain amount; and a pin on each actuating lever extending into the slot of the lift block for which the lever is provided to move the lift block upwardly upon said relative upward movement of said weight with respect to the car, thereby applying said safety brake to bring the car to a stop.

7. In an elevator system in which safety mechanism is provided on a body movable in the hoistway for application to a guide rail to stop said body, actuating mechanism for said safety mechanism comprising; a weight carried by said body adapted to move upwardly with respect thereto; resilient means carried by said body partially balancing said weight and adjusted so that upward movement of said weight relative to said body takes place when the downward acceleration of the body exceeds a certain amount; a member connected to said body adapted to move upwardly with respect thereto; speed responsive mechanism for causing said upward movement of said member when said body in its downward movement exceeds a certain speed; and means operable by upward movement of said weight with respect to said body or by upward movement of said member with respect to said body to apply said safety mechanism to said rail.

8. In an elevator system in which a safety brake rail clamp is provided on a body movable in the hoistway for application to a guide rail to stop said body, actuating mechanism for said rail clamp comprising; a weight carried by said body adapted to move upwardly with respect thereto; a spring carried by said body and connected to said weight to act in opposition thereto and adjusted so that upward movement of said weight relative to said body takes place when the downward acceleration of the body exceeds a certain amount; a member connected to said body; a governor connected to be driven by said body and operable to cause upward movement of said member with respect to said body when said body in its downward movement exceeds a certain speed; and means operable upon upward movement with respect to said body either of said weight or said actuating member to apply said rail clamp to said rail.

9. In an elevator system in which a safety brake rail clamp is provided on the car for application to a guide rail to stop said car, actuating mechanism for said rail clamp comprising; a weight carried by said car adapted to move upwardly with respect thereto; a compression spring carried by said car and connected to said weight to act in opposition thereto and adjusted so that upward movement of said weight relative to said car takes place when the downward acceleration of the car exceeds a certain amount; a governor rope releasably connected to be driven by said car; a governor driven by said rope and operable when said car in its downward movement exceeds a certain speed to cause upward movement of said rope with respect to said car; a member adapted for movement to apply said clamp to said rail; means carried by said rope for engaging said member to move it into position to apply said rail clamp upon said upward movement of said rope with respect to said car; and means actuated by said upward movement of said weight with respect to said car for engaging said member to move it into position to apply said rail clamp.

10. In an elevator system in which a safety brake rail clamp is provided on the car for application to a guide rail to stop said car, actuating mechanism for said rail clamp comprising; a weight carried by said car adapted to move upwardly with respect thereto; a compression spring carried by said car and connected to said weight to act in opposition thereto and adjusted so that upward movement of said weight relative to said car takes place when the downward acceleration of the car exceeds a certain amount; a releasing carrier on said car; a governor rope connected through said releasing carrier to be driven by said car; a governor driven by said rope; means operable by said governor when said car in its downward movement exceeds a certain speed to release said releasing carrier and cause upward movement of said rope with respect to said car; an operating member for said clamp; a lift member operable by said upward movement of said rope with respect to said car for engaging said operating member to move it into position to apply said rail clamp to said rail; and a second lift member operable by said upward movement of said weight with respect to said car for engaging said operating member to move it into position to apply said rail clamp to said rail.

ERIC ALBERT SAHLIN.

REFERENCES CITED

The following references are of record in the file of this patent:

UNITED STATES PATENTS

| Number | Name | Date |
| --- | --- | --- |
| 1,302,601 | Smith | May 6, 1919 |
| 2,001,361 | Hymans | May 14, 1935 |